A. A. HORNE.
Adjustable Stay-Springs for Vehicles.
No. 142,105.  Patented August 26, 1873.
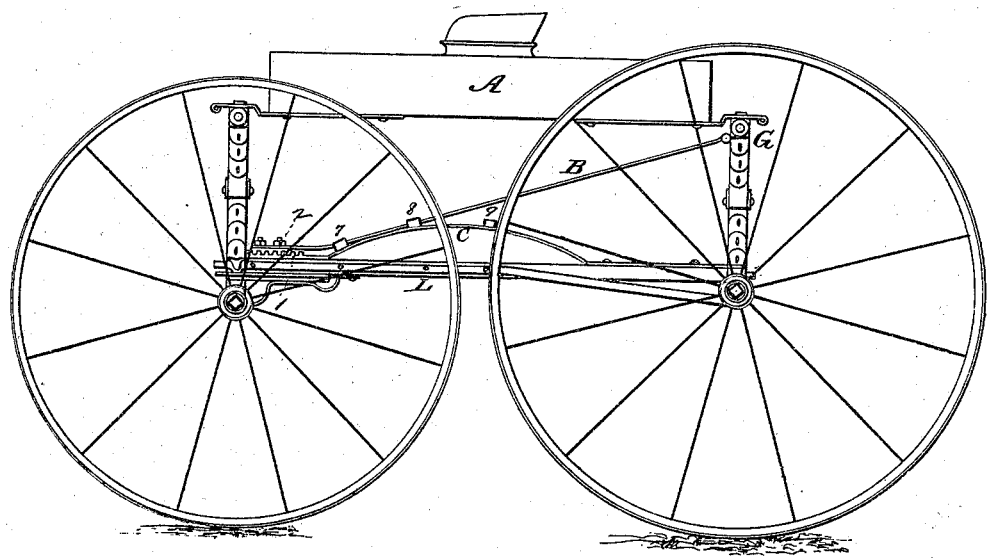
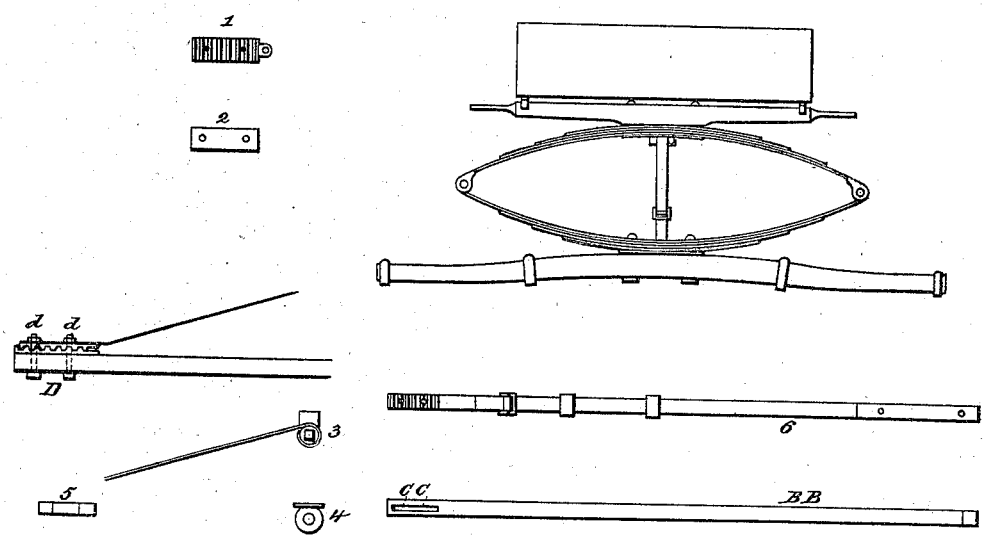
Witnesses.  
Thos. J. Gamble  
F. E. Brown
Inventor:  
Alfred A. Horne

UNITED STATES PATENT OFFICE.

ALFRED A. HORNE, OF MOUNT MORRIS, NEW YORK.

IMPROVEMENT IN ADJUSTABLE STAY-SPRINGS FOR VEHICLES.

Specification forming part of Letters Patent No. 142,105, dated August 26, 1873; application filed March 18, 1873.

*To all whom it may concern:*

Be it known that I, ALFRED A. HORNE, of Mount Morris, Livingston county and State of New York, have invented an Adjustable Steel Brace or Stay-Spring for Vehicles; and and I do hereby declare that the following is an exact description thereof, reference being had to the accompanying drawings, letters, and figures of reference marked thereon.

My invention consists of an improved adjustable steel spring or brace, (corrugated on under side near front end, for the purpose of operating in connection with corrugated plate bolted to front end of reach, which admits of the spring being adjusted to any desired length,) running parallel with the reach of the vehicle, and diagonally from near the front end of the same to the top of the rear elliptic spring, and resting on an arched truss of iron or steel secured to top of reach, over which it adjusts itself as the elliptic springs are depressed, so as to preserve its effective length, and is for the purpose of keeping the elliptic springs in a vertical position, strengthening the rear one, and relieving both, and the parts of the vehicle to which they are attached, from the strain, concussion, or shock brought upon them by passing over rough or uneven surfaces, or by any other cause.

Letter A is a side view of buggy embodying my invention. Letter B is a side view of brace or stay-spring. Letter C is a side view of arched truss. Letter D represents section of front end of reach and spring, together with corrugated plate, Fig. 1, and plate, Fig. 2.

Figure 1 is plan of corrugated plate on forward end of arched truss C. Fig. 2 is a corrugated plate secured to stay-springs B, and covering front end of spring when adjusted and secured to Fig. 1, bolts $d\ d$, in D. Fig. 3 is eye on rear end of spring for receiving bolt. Fig. 4 forms hinge, when in connection with Fig. 3, for attaching stay-spring to top of rear elliptic spring. Fig. 5 is bolt which, when put into 3 and 4, completes hinge. Fig. 6 is plan of arched truss. B B is plan of brace or stay-spring. L is reach. G is rear elliptic spring. $c\ c$ is slot in stay-spring. Fig. 7 is guide on arched truss for keeping spring in position and holding rubber pad. Fig. 8 is loop on arched truss through which spring passes, also holding rubber pad; Fig. 9, rubber inserted in seat.

What I claim as my invention is—

1. In combination with the arched truss C, having corrugated plate 1 and loops 7 and 8, the spring B, having the corrugated plate 2, the whole constructed to operate substantially as and for the purpose set forth.

2. In combination with the corrugated plate 1 of the arched truss C, the corrugated plate 2 and spring B, substantially as and for the purpose set forth.

ALFRED A. HORNE.

Witnesses:
  T. J. GAMBLE,
  MOSES CAMP.